United States Patent

Sparlin

[15] 3,698,850

[45] Oct. 17, 1972

[54] PROMOTION OF BURNING OF OIL SLICKS WITH PARTICULATE, FOAMED ALKALI METAL SILICATES

[72] Inventor: Derry D. Sparlin, Ponca City, Okla.

[73] Assignee: Continental Oil Company, Ponca City, Okla.

[22] Filed: March 8, 1972

[21] Appl. No.: 232,923

Related U.S. Application Data

[63] Continuation-in-part of Ser. No. 132,547, April 8, 1971, abandoned.

[52] U.S. Cl..................431/8, 210/40, 210/DIG. 21, 431/2

[51] Int. Cl. .............................................E02b 15/04

[58] Field of Search...............210/40, DIG. 21; 431/8

[56] References Cited

UNITED STATES PATENTS 3,589,844    6/1971    Kraemer..................210/40 X

*Primary Examiner*—Samih N. Zaharna
*Attorney*—Joseph C. Kotarski et al.

[57] ABSTRACT

Particles of foamed water soluble and dispersible alkali metal silicates are distributed over oil slicks to absorb the oil. The oil is then burned after which the water soluble and dispersible particulate foamed alkali metal silicate particles solubilize and disperse.

4 Claims, No Drawings

PROMOTION OF BURNING OF OIL SLICKS WITH PARTICULATE, FOAMED ALKALI METAL SILICATES

CROSS-REFERENCE TO RELATED APPLICATIONS

This application is a continuation-in-part of application Ser. No. 132,547 of Derry D. Sparlin, filed Apr. 8, 1971, entitled "Promotion of Burning of Oil Slicks with Particulate Foamed Alkali Metal Silicates," and now abandoned.

BACKGROUND OF THE INVENTION

This invention relates to an improved method for disposal of oil slicks by burning.

Oil spills upon water are of growing environmental concern. Often, attempts are made to burn such oil slicks. However, such attempts at disposing of oil slicks by burning are often completely unsuccessful or only partially successful because the adjacent water maintains the oil film at too low a temperature to maintain combustion, because the oil film is too thin, or because the oil film is not a continuous film.

Recently, advances have been made in the disposal of oil slicks from water by burning, and considerably improved results have been obtained. Thus, *Ocean Industry*, page 51, March 1970, and *Ocean Industry*, pages 60 and 61, June 1970, disclose that tiny foamed glass nodules or porous glass beads known as "-SeaBeads" are applied to oil spills on water after which the oil spills are ignited with clean burning thereof. The "SeaBeads" are approximately one-fourth of an inch in diameter and contain hundreds of water tight air cells which allow them to flat. When spread over an oil spill on the surface of a body of water, their outer surfaces quickly become covered with oil. The oil can then be ignited. As the oil burns, the capillary action of the beads replenishes the thin film of burning oil promoting clean burning of the oil spill. However, this method still has significant disadvantages. That is, after burning is completed the glass nodules must be collected. They do not solubilize or sink. If left in the water they eventually wash upon beaches causing pollution thereof. In addition, such glass nodules have a high cost which often renders their use uneconomical.

Another advance in the art of burning oil slicks form water having substantial merit is disclosed by *Ocean Industry*, page 61, June 1970. It is disclosed that a product, composed of extremely fine particles of fumed silica which have been surface treated with a silane coating to render the product hydrophobic, is applied to oil spills with subsequent ignition of the oil slicks. The material is disclosed to act as a wick when applied to the surface of the floating oil slick. Combustion is thus promoted. Through capillary action, a small quantity of oil is drawn up from the surface of the oil mass so that it is isolated and insulated from the colder oil and sea water below and thus burns readily. The chemically induced burning is claimed to destroy approximately 98 percent of the oil. HOwever, the remaining 2 percent forms a thin, hard crust that floats and must be collected to prevent pollution of beaches thereby. The collection of the crusty material involves considerable additional expense.

Therefore, it is readily seen that a need still exists for an improvement in the art of burning oil slicks from water. An improvement permitting clean burning of oil slicks from water which eliminates the steps of collecting residues formed thereby clearly constitutes a significant advance in the art.

OBJECTS OF THE INVENTION

One object of this invention is to promote disposal of oil slicks from water by burning without the necessity of collecting residues thereafter.

This and other objects and advantages will appear from the following description of the embodiments of the invention, and the most novel features will be particularly pointed out hereinafter in connection with the appended claims.

SUMMARY OF THE INVENTION

In one aspect, this invention discloses an improvement in the disposal of oil slicks form water by burning, said improvement comprising distributing a foamed, water soluble and dispersible, particulate alkali metal silicate over the surface of the oil slick upon the water and subsequently igniting the oil slick which had thus been treated by distributing thereupon the foamed, water soluble and dispersible particulate alkali metal silicate.

DESCRIPTION OF THE PREFERRED EMBODIMENTS

The foamed, water soluble and dispersible particulate alkali metal silicate employed according to this invention can be formed by any means known to the art. A complete description of a process for forming foamed alkali metal silicates which can be reduced to particles suitable for employment according to he process of this invention is disclosed by E. Jack Baker in a paper presented at the 12th National SAMPE symposium entitled "New Applications for Sodium Silicate." Foamed, particulate, water soluble and dispersible, sodium silicate is a presently preferred material for employment according to the process of this invention. Foamed, particulate, water soluble and dispersable potassium silicate is also a presently preferred material.

It is known that when viscous sodium silicate liquid is rapidly boiled, the residue formed is a rigid, strong, white foam. Sodium silicates are compositions in which sodium oxide ($Na_2O$) and silicon dioxide ($SiO_2$) are combined in varying proportions, usually with some water. Sodium silicates can be made by fusing high purity soda ash and silica sand in an open hearth furnace at temperatures in the range of about 2,400° to 2,700°F. The sodium silicates made in such furnaces generally vary in ratio from about 2.5 to 4 parts by weight of silicon dioxide to 1 part of sodium oxide. The sodium oxide is derived from soda ash. The molten sodium silicate discharged from the furnace is conventionally either cooled to a solid glass by pouring it onto an iron casing conveyor belt or by running it directly into a rotary atmospheric dissolver. In such a unit, the action of steam and hot water dissolves the sodium silicate glass to make a liquid solution of sodium silicate. Various grades of liquid sodium silicate with different alkalinites and concentration are commercially available. One presently preferred product for preparing a foamed particulate sodium silicate for use according to this invention has a weight ratio of 1 $Na_2O:3.22\ SiO_2$ and a solids content of 38.3 percent. Analogous water soluble and dispersible potassium and other alkali metal silicate foams can be prepared in like manner.

A presently preferred means of forming an excellent sodium silicate foamed product suitable for reduction to particles for use according to the process of this invention involves heating a liquid sodium silicate in a commercial microwave oven. The microwave process allows the material to be heated uniformly throughout its total thickness. This feature is important because the extremely low thermal conductivity of the foam which is first formed otherwise prevents uniform heating of the remaining aqueous liquid solution of the sodium silicate. Potassium and other alkali metal foamed products can also be prepared in similar manner.

Such sodium silicate foams are extremely economical to produce, and can be produced at a much lower cost than other materials which are known to promote burning of oil spills.

The density of the foamed sodium or other alkali metal silicate which is formed can be controlled by conducting the foaming operation in a mold of suitable size in proportion to the amount of liquid sodium silicate employed, by employing well known fillers to increase the resulting density of the foam, by including reactants such as ZnO, formamide, acetamide, CaO, BdO, $Ca(CO_3)_2$, Borax, etc, or by a combination of these methods. Techniques for controlling the density of the resulting foam are well known to those skilled in the art.

The following Table I presents details on the preparation of some exemplary foams.

TABLE I

| Sample | Volume Sodium Silicate (ml) | ADDITIVE Type | amt. (g) | Time in microwave Oven (min) | Density of Foam (g/cc) |
|---|---|---|---|---|---|
| Grade 33[1]- 1 $Na_2O:3.3\ SiO_2$- | | | 37.9% Solids | | |
| A | 20 | — | — | 2 ½ | 0.084 |
| B | 20 | ZnO | 1.5 | 2 ½ | 0.142 |
| C | 30 | CaO | 2.25 | 3 | 0.097 |
| D | 30 | $Ca(CO_3)_2$ | 2.25 | 3 | 0.226 |
| E | 30 | Borax | 2.25 | 11 3 | 0.093 |
| Grade D[2] - 1 $Na_2O:2.00\ SiO_2$ | | | - 44.4% Solids | | |
| A | 20 | ZnO | 1.4 | 1 ½ | 0.045 |
| B | 20 | ZnO + acetamide | 1.4 0.3 | — 1 ½ | — 0.037 |
| C | 20 | silica flour | 1.0 | 1 ½ | 0.053 |
| D | 20 | ZnO | 3.0 | 1 ½ | 0.089 |
| E | 20 | ZnO | 6.0 | 1 ½ | 0.136 |

[1]Grade 33 sodium silicate is a product of the Diamond Shamrock Company, Cleveland, Ohio.
[2]Grade D sodium silicate is a product of the Philadelphia Quartz Company of Philadelphia, Pennsylvania.

Once the sodium silicate foam has been produced, it can be reduced to suitable particle size for use according to the process of this invention by any means known to the art for forming particles from larger articles. For example, conventional choppers, grinders, and the like can be employed. Other alkali metal silicate foams can be handled in like manner.

If desired, the particles can be treated, as with trichlorosilane, to render them oleophillic, if desired.

The density of the foamed particulate alkali metal silicates employed according to this invention should be sufficient that the particles of foamed alkali metal silicates can be readily placed upon oil slicks, but should be less than the density of water. Preferably, such particles should have a density in the range of about 0.01 to 0.99 grams per cc.

The particle size of suitable foamed particulate alkali metal silicates is generally operable in the range of about 0.01 to 10 cm in the broadest dimension of the foamed particles, preferably, the particle size will be in the range of 0.05 to 2.5 cm.

To promote adequate burning of oil spills, about 1 to 10,000 particles of foamed alkali metal silicate are applied per square foot of oil slick surface. Preferably, about 500 to 1,000 particles per square foot with particle size average of 1 cm diameter are employed.

Articles of foamed alkali metal silicates which do not contact the oil spill surface, but contact the water instead, are solubilized and dispersed. The sodium (or other alkali metal) and silicate moieties solubilized thereby are natural constituents of the aqueous environment, and are nonpolluting. The extremely small particles which are dispersed thereby are nonharmful. Carbon residue, produced by burning heavy crudes, sinks and is nondeleterious to the environment.

The particles of the foamed sodium (or other alkali metal) silicate which contact the oil slick promote complete combustion of the oil slick upon ignition thereof. Upon completion of combustion of the oil slick, the particles contact water and are dissolved and dispersed thereby. The moieties released by the dissolving of this foamed alkali metal silicate, that is, the alkali metal and silicate moieties, are natural constituents of the aqueous environment, and are nonpolluting. The finely dispersed particles which are released are not harmful.

The improved process of this invention is particularly advantageous in that the combustion promoting material or residues from the combustion do not need to be collected after combustion of the oil slick to avoid pollution. Considerable savings in time and equipment outlay are realized.

The oil slicks which are advantageously disposed of from the surface of water by the process of the instant invention include layers of those hydrocarbons which normally constitute a problem of pollution of water surfaces such as rivers, bays, oceans, harbors, and the like. Some examples of such hydrocarbons include: kerosine, diesel fuel oil, crude oils, and the like.

The particles of the foamed alkali metal silicate can be distributed upon the surface of the oil slick by any means known to the art for the distribution of solid particles upon a surface. For example such particles can be distributed over the surface of the oil slick by feeding into high speed streams of air directed to broadcast the particles over the surface, by rotary broadcasters, by dispersed air drops, and the like.

EXAMPLES

Example 1

A quantity of "N" sodium silicate obtained from the Philadelphia Quartz Company (Philadelphia, Pennsylvania) which had a weight ratio of $Na_2O:SiO_2$ of 1:3.22 and a solids content of 37.6 weight percent was converted into a foamed sodium silicate by rapidly boiling off the water in a microwave oven to dryness. This foamed sodium silicate was ground into pieces of 20-200 U.S. mesh size (0.84–0.074 mm sieve opening).

The thus prepared particulate foamed alkali metal silicate was spread upon the surface of an oil slick formed in a 1,000 ml beaker which contained 800 ml of water with approximately 100 ml of diesel fuel on the surface thereof at the rate of about 2,000 particles per square foot.

The oil slick on the water which had thus been treated with the foamed sodium silicate particles was then ignited. The oil burned until combustion was complete, and all the oil was consumed. Upon completion of combustion, with slight agitation of the water, to visual observation, all of the particulate foamed sodium silicate appeared to be dissolved in the water or sunk to the bottom of the beaker. Within a short time thereafter, all of the foamed particulate alkali metal silicate which had sunk to the bottom of the beaker dissolved in the water. Upon further study, it was determined that very minute particles were dispersed in the water rather than being solubilized. Only a small amount of carbon residue from the burning of the oil remained in the bottom of the beaker.

This example demonstrates that when a particulate foamed alkali metal silicate is distributed upon an oil spill upon water and the oil is subsequently ignited, that complete combustion occurs and that the particulate foamed alkali metal silicate remaining thereafter solubilizes and disperses into the water without the necessity of collecting residues thereafter.

EXAMPLE 2

Another sample of foam was prepared as disclosed in Example 1. A cube shaped particle of such foam which was 1-inch cubed was placed upon the surface of diesel fuel on water according to the method described in Example 1. Upon ignition, the oil slick was completely combusted.

After burning was completed the cube sank to the bottom of the water. Examination of the cube at that time showed that the cube appeared to be dissolving in the water. Dissolving and dispersing of the cube continued. Within 24 hours, the cube had completely dissolved and dispersed, that is, the water had only very minute particles remaining in it.

This example further demonstrates the improved process of this invention wherein particles of foamed alkali metal silicate are distributed upon an oil slick on water with subsequent ignition of the oil slick and complete combustion thereof, and without the necessity of collecting residues thereafter.

Example 3

A quantity of "KASIL No. 1" potassium silicate was obtained from Philadelphia Quartz Company (Philadelphia, Pennsylvania) which had a weight ratio ($SiO_2/K_2O$) of 2.50, Be' 29.8°. A total of 30 ml of the potassium silicate was put into a microwave oven, and after 3 minutes was completely foamed to approximately twice its volume. A 2.9 gram portion of the foam was crushed and placed in a container containing 400 ml of water. Upon stirring for 24 hours at about 25°C, it was observed that most of the material had dissipated to form a very fine dispersion in the water of silica particles. The water was filtered and the filtrate was dried. There had been a loss of 0.75 g of material which was dissolved in the water.

This run demonstrates that a potassium silicate foam of the invention disperses and solubilizes upon contact with water.

Example 4

A container was filled with 1 liter of water and 50 ml of crude oil. A total volume of 80 ml of foam prepared from the potassium silicate was crushed into particles and spread upon the crude oil layer. A small quantity of gasoline was added, and the material was ignited. After the fire had burned out, practically all of the crude oil and potassium silicate foam was gone. The foam had solubilized and dispersed in the water as very minute particles of silica with a small quantity sinking to the bottom of the container.

This run demonstrates that a potassium silicate foam is effective to dispose of crude oil slicks by burning, and that subsequent to burning the potassium silicate foam is dispersed and solubilized in water, so that collection thereof is unneccessary.

Example 5

Another container was filled with 1 liter of water and approximately 100 ml of No. 2 diesel fuel. Four 40 ml samples of the potassium silicate were foamed to 80 ml volumes. Each sample was sliced into four equal parts and the resulting foam articles were placed on the oil slick. The oil slick was then ignited. When the flame had extinguished, there was only a slight film of oil remaining on the water. A large portion of the foam had solubilized and dispersed into the water as very fine particles of silicate. However, a portion of the foam sank to the bottom of the vessel and remained on the bottom as a very mushy material. This material was readily dispersed by agitation to form very minute particles suspended in water.

Approximately 20 ml of the mushy foam material which had sunk to the bottom of the vessel and about 25 ml of the water from the vessel were dispensed into a fish tank containing 400 ml of water and 5 healthy guppies. The guppies remained healthy.

This example further demonstrates that potassium silicate foam is effective to burn oil slicks from water after which the foam solubilizes and disperses into the water. It is further demonstrated that the residues of the foam are nondeleterious to fish life.

I claim:

1. In the disposal of oil slicks from water by burning, the improvement comprising:
    a. distributing a foamed, water soluble and dispersible, particulate alkali metal silicate having a density of about 0.01 g/cc to 0.99 g/cc and a particle size of 0.01 to 10 cm across the broadest dimension over the surface of the oil slick in sufficient amount to act as a wick and
    b. igniting the oil slick which has been treated with the alkali metal silicate.

2. The method of claim 1 wherein about 1 to 10,000 particles of foamed, water soluble and dispersible particulate alkali metal silicate are applied per square foot of oil slick surface.

3. The method of claim 1 wherein the alkali metal silicate is a potassium silicate.

4. The method of claim 1 wherein the alkali metal silicate is a sodium silicate.

* * * * *